United States Patent [19]

Araki et al.

[11] Patent Number: 5,048,798
[45] Date of Patent: Sep. 17, 1991

[54] APPARATUS FOR INSERTING THREAD INTO TUBE

[75] Inventors: Nobuo Araki, Tokyo; Kazufumi Tabata, Narashino; Kiyomi Yokoi; Tadami Ashidate, both of Tokyo, all of Japan

[73] Assignee: Nippon Steel Welding Products & Engineering Co., Ltd., 805 Fifteenth Street, NW, Japan

[21] Appl. No.: 428,518

[22] Filed: Oct. 30, 1989

Related U.S. Application Data

[62] Division of Ser. No. 310,671, Feb. 14, 1989, Pat. No. 4,953,827.

[30] Foreign Application Priority Data

Aug. 11, 1988 [JP] Japan ................................. 63-199015
Aug. 15, 1988 [JP] Japan ................................. 63-201910

[51] Int. Cl.$^5$ .............................................. B66F 3/24
[52] U.S. Cl. .................................................. 254/134.4
[58] Field of Search .......... 254/1, 134.3 FT, 134.3 R, 254/134.4, 109.06 R; 15/109.06 R; 226/25, 43, 178

[56] References Cited

U.S. PATENT DOCUMENTS

| | | | |
|---|---|---|---|
| 3,837,624 | 9/1974 | Dandurand | 254/134.4 |
| 4,185,809 | 1/1980 | Jonnes | 254/134.4 |
| 4,691,896 | 9/1987 | Reeve et al. | 254/134.4 |
| 4,756,510 | 7/1988 | Klamm et al. | 254/134.4 |
| 4,794,791 | 1/1989 | Wittrisch | 254/134.3 FT |
| 4,850,569 | 7/1989 | Griffioen et al. | 254/134.4 |
| 4,856,760 | 8/1989 | Frost et al. | 254/134.4 |

Primary Examiner—Robert C. Watson
Attorney, Agent, or Firm—Wenderoth, Lind & Ponack

[57] ABSTRACT

The stream of the gas carries a thread held in the sealed container forward into and through the tube. The pressure of the gas in the sealed container is kept high enough to maintain the mean flow rate of the gas at any given point of the tube above the travel speed of the thread. A positive longitudinal surging motion is given to the thread advancing through the tube. A frictional force between the flowing gas and the peripheral surface of the thread, a static pressure working on an area corresponding to the cross-sectional area of the thread, and a difference between the static pressures on both sides of the surging portion of the thread work together to carry the thread forward.

36 Claims, 6 Drawing Sheets

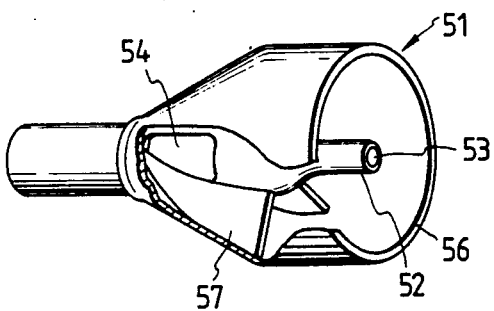
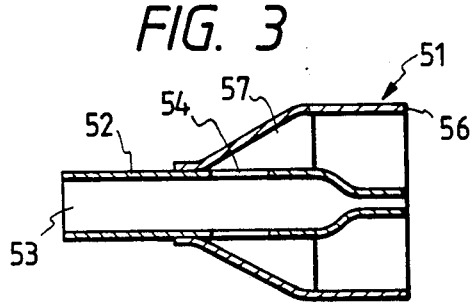
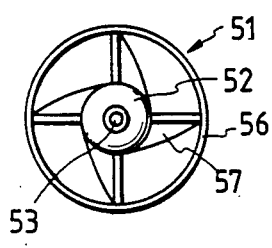
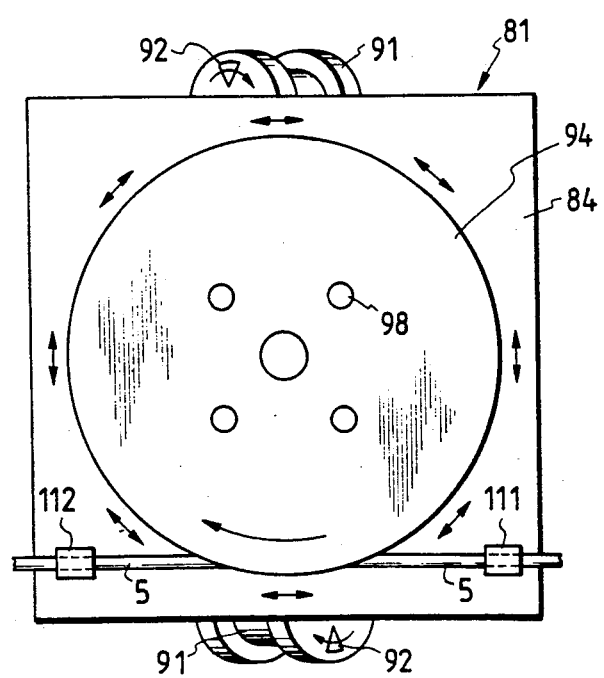
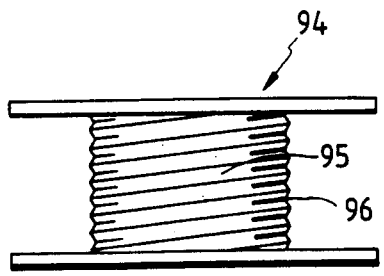

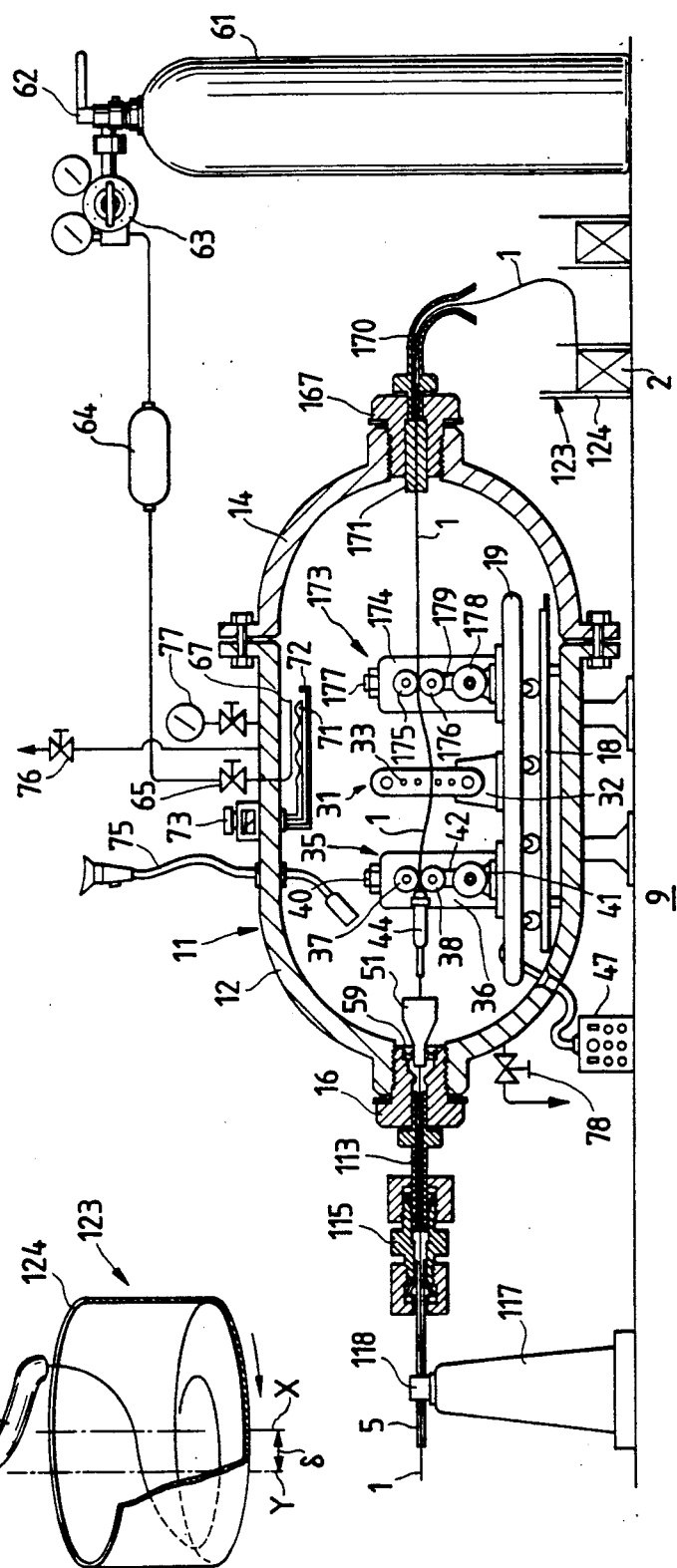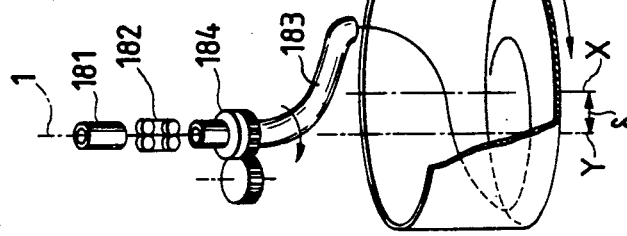

APPARATUS FOR INSERTING THREAD INTO TUBE

This application is a Rule 1.60 divisional application of Ser. No. 07/310,671, filed Feb. 14, 1989, now U.S. Pat. No. 4,953,827.

BACKGROUND OF THE INVENTION

1. Field of the Invention

This invention relates to a method and apparatus for inserting threads into tubes, and more particularly to a method and apparatus for inserting optical fibers or other threads into tubes of relatively small diameters and great lengths by making use of a stream of gases.

The threads inserted into tubes according to the method and apparatus of this invention are optical fibers and other thin and long filaments, wires and cables of soft materials that can be carried forward by a stream of gases. The threads may have a single core or multiple cores or may be made up of twisted filaments. The optical fiber comprises a fiber element consisting of an inner core and an outer cladding, plus a coating of synthetic resin, metal, ceramic and other materials. The tubes are of such metals as steel and aluminum and of such non-metallic materials as plastic.

2. Description of the Prior Art

The following is an example in which the inserted thread is an optical fiber.

Recently optical communications cables have come into wide use. Because of their low strength and high susceptibility to various environmental attacks, however, more and more optical communications cables have come to be supplied in metal tubes and other protective conduits. In some of such covered types, clearance is left between the optical fiber and the protective conduit in order to prevent the transmission loss due to the different coefficients of thermal expansion of the conduit and optical fiber. (Hereinafter, this type will be called the optical fiber cord.)

Such optical fiber cords can be made by taking advantage of a stream of fluids. An example of this technology is disclosed in Japanese Provisional Patent Publication No. 29014 of 1982 "Method of Leading Optical Fiber into Pipe". This method passes a moving member attached to the head end of a towing thread from one end to the other of a pipe by making use of the static pressure of a fluid. Then, an optical fiber connected to the towing thread is pulled into the pipe. Thus, the optical fiber is passed through the pipe after the towing thread has been passed therethrough. As such, this conventional method is complicated, troublesome and inefficient. To avoid the risk of breaking, furthermore, the towing force must be kept below the strength of the optical fiber. Because of this limitation, the method has been inapplicable to the making of such optical fiber cords as are, for example, thinner than 2 mm in diameter and greater than 30 m in length.

Other methods utilizing the stream of fluids are disclosed in U.S. Pat. Nos. 4,332,436 and 4,691,896 (EPC Pat. No. 0 108 590). In these methods, pressurized fluids are passed from one end of a pipe to the other. The stream of fluid exerts a frictional force and a static pressure on the surface of an optical fiber. The frictional force and static pressure, in combination, drive the optical fiber forward through the pipe. Therefore, these methods are free from the problems of complexity and fiber breakage which exist with the aforementioned technology of Japanese Provisional Patent Publication No. 29014 of 1982. Yet, the magnitude of applicable fiber drive force is limited because the static pressure works only on an area corresponding to the cross-sectional area of the optical fiber. The peripheral surface of the optical fiber moving forward is substantially in contact with the inner surface of the pipe throughout the entire length of the fiber. Therefore, the optical fiber receives a great frictional force from the inner surface of the pipe. This frictional force works opposite to the carrying frictional force between the fluid and optical fiber. Because of this, it has taken a long time to pass optical fibers through pipes of small diameters and great lengths. Besides, it has been impossible to pass optical fibers through pipes several hundred meters long.

SUMMARY OF THE INVENTION

The object of this invention is to provide a method and apparatus for inserting threads into tubes of small diameters and great lengths, even of such lengths as several hundred meters, in a short time.

According to the inserting method of this invention, a pressurized gas from a hermetically sealed container is passed into a tube from one end thereof. The stream of the gas carries a thread held in the sealed container forward into and through the tube. The pressure of the gas in the sealed container is kept high enough so that the mean flow rate of the gas at a given point of the tube is higher than the advancing speed of the thread. The thread advancing through the tube is caused to make a positive longitudinal surging motion.

Air, nitrogen gas and other appropriate gas are among the gases popularly supplied into the tube. When the supply volume of the pressurized gas is small or the capacity of the hermetically sealed container is large, the gas previously filled in the container is supplied into the tube. Conversely, when the supply volume of the gas is large or the capacity of the container is small, the gas is supplied from the source through the container. Pressurized gas cylinders and compressors are popularly used as the supply source of the pressurized gas.

The surging motion can be given to the thread by vibrating the tube, passing a turbulent stream of pressurized gas from one end of the tube, or flapping a fin attached to the leading end of the thread by the stream of gas. Two or more of said methods may be combined, as well. It is preferable to cause the thread to surge in the tube throughout the entire length thereof.

The pressurized gas supplied from one end of the tube flows toward the other end thereof. Where the thread lies, the gas flows through the clearance left between the inner surface of the tube and the peripheral surface of the thread. Then, the thread is carried forward by the force of friction between the flowing gas and the peripheral surface of the thread, the static pressure working on an area corresponding to the cross-sectional area of the thread, and the difference in the static pressures of the gas built up before and after a portion of the surging thread that is aslant to the center axis of the tube.

Since the thread-driving force of this invention is distributed substantially uniformly throughout the entire length of the thread, no excessive stretching force works thereon. Therefore, the thread does not break while being passed through the tube. The thread is driven forward by a great force which comprises, as mentioned previously, not only the frictional force acting on the peripheral surface of the thread and the static pressure working on an area corresponding to the cross-sectional area of the thread, but also the difference in the static pressure of the gas built up before and after the slant portion of the surging thread. The surging thead only locally, i.e., at the top and bottom of each wave, comes in contact with the inner surface of the tube. Besides, the condition of the positively caused surge varies with time. Accordingly, the time during which the thread is in contact with the inner surface of the tube is limited. Because the thread thus substantially hangs in the air inside the tube, practically speaking very little friction occurs between the thread and the inner surface of the tube. All this permits inserting a thread through a tube of small diameter and great length. Optical fiber cords made by this method may have an outside diameter of under 2 mm and a length of over 30 m. The obtainable length can exceed several hundred meters. The high advancing speed of the thread results in shorter inserting time.

In the method just described, the thread to be passed through the tube may be coiled and placed outside the sealed container. The thread can be coiled by winding the thread around a spool or laying multiple loops of the thread one over another. The thread is unwound by pulling tangentially from a coil made by the former method and axially from a coil made by the latter method. The thread thus loosened is supplied from outside to inside the sealed container, and thence into the tube.

In the latter coiling method, the multiple loops of the thread need not always be concentrically arranged. Loops of the thread may be loosely piled up into a spiral form from the bottom. The thread thus coiled can be readily loosened without getting entangled or twisted if the piled up loops are unwound from the top, one after another. A coil may also be formed by piling up loops of the thread into a pattern that may look like a flower when viewed from above. This pattern can be obtained by laying individual loops of the thread eccentric to one another so that the centers of the loops shift slightly away from one another along the circumference of a core circle. An axial kink that may develop when the thread is pulled out of a coil can be eliminated by giving a reverse kink when the thread is wound into a coil. The thread coiled with a reverse kink does not develop a kink when it is pulled out of a coil, thereby assuring smooth tangle- or twist-free loosening. Application of such lubricant as graphite and molybdenum disulfide to the thead may also assure smooth loosening of the thread.

The inserting method just described can be implemented efficiently by use of a thread inserting apparatus which comprises a hermetically sealed container, a device for supplying the thread provided inside or outside the sealed container, a pressurized gas supply source connected to the sealed container, a coupler to connect one end of a tube into which a thread is to be passed and the sealed container, and a device to give a positive surging motion to the thread.

The device for supplying thread is a rotatably supported spool or top-opened container that holds a loop or coil of thread to be inserted into a tube. When the thread supplying device is installed outside the sealed container, it is necessary to provide an auxiliary supply means to pull or push the thread into the sealed container. The moment of inertia and bearing resistance of the spool should preferably be minimized so as not to hinder the entrance of the thread into the tube.

The device to give a positive surging motion to the thread comprises a tube vibrator or a device to supply a turbulent stream of gas or a gas-flapped fin attached to the leading end of the thread.

BRIEF DESCRIPTION OF THE DRAWINGS

FIG. 1a is a partially cross-sectional side elevation of a portion of said apparatus that supplies the optical fiber and a pressurized nitrogen gas into a tube. FIG. 1b is a partially cross-sectional side elevation of a portion of said apparatus that gives a surging motion to the optical fiber by vibration;

FIG. 2 is a perspective view of a turbulence generating device of the apparatus shown in FIG. 1;

FIG. 3 is a cross-sectional view of the turbulence generating device of FIG. 2;

FIG. 4 is a front view of the turbulence generating device of FIG. 2;

FIG. 5 is a plan view is a vibrating table of the apparatus shown in FIG. 1;

FIG. 6 is a front view showing a preferred embodiment of a bobbin attached to the vibrating table;

FIG. 13 is a cross-sectional side elevation showing a portion of another embodiment that feeds an optical fiber and pressurized nitrogen gas into a tube; and FIG. 14 is a schematic perspective view of a device that feeds an optical fiber into a container.

DESCRIPTION OF THE PREFERRED EMBODIMENTS

An apparatus to insert an optical fiber into a metal tube and an inserting method employing said apparatus are described in the following.

Preferred Embodiment I

Figure 1A:
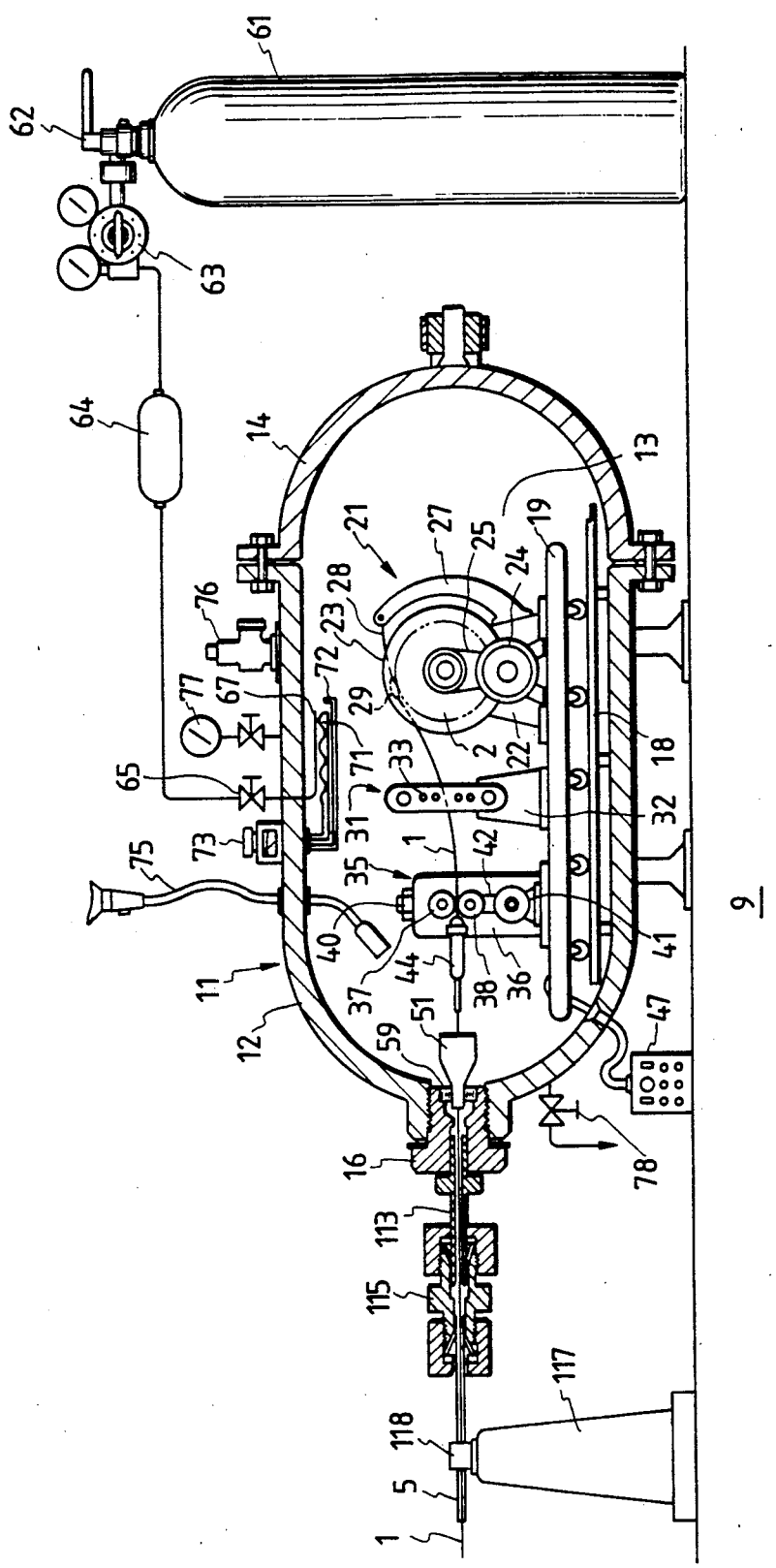
FIGS. 1a and 1b show a preferred embodiment of an apparatus to insert an optical fiber into a tube while giving a surging motion to the optical fiber.
Figure 1B:
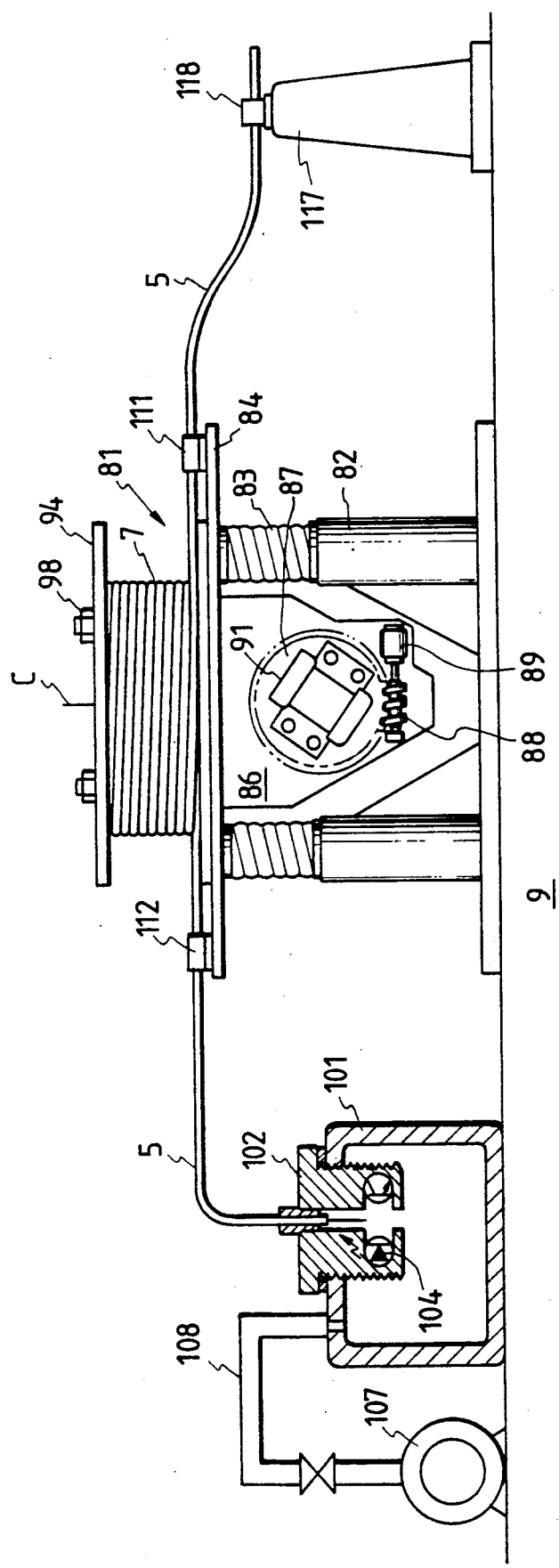

FIGS. 1a and 1b show an example of an apparatus to inserting an optical fiber by use of a stream of gas into an oscillating tube.

As is illustrated, the optical fiber inserting apparatus has a hermetically sealed container 11 which comprises a cylindrical container proper 12 and an openable semi-spherical cover 14 to cover an opening 13 at the rear thereof. A plug 16 is screwed into the front end of the sealed container 11.

In the lower part of the container 11 are laid longitudinally extending rails 18. A carriage 19 placed on the rails 18 is adapted to move therealong. The carriage 19 carries a spool assembly 21, an optical fiber condition sensor 31 and an optical fiber feeder 35.

The spool assembly 21 comprises a spool 23 that is rotatably supported on a bearing stand 22 mounted on the carriage 19. The spool 23 on the bearing stand 22 is detachable so that the spool 23 can be replaced when the carriage 19 is taken out though the opening 3 of the container. A motor 24 rotates the spool 23 through a belt transmission mechanism 25. A control device 47 installed outside the sealed container 11 controls the speed of the motor 24, as will be described later. A wire 28 is tied to the tip of an arm 27 extending upward from the bearing stand 22. A plastic ring 29 is attached to the tip of the wire 28. The spool 23 pays off an optical fiber 1 through the ring 29. Then, the ring 29 pulls the optical fiber 1 backward, thereby unraveling the optical fiber 1 from a coil 2 thereof.

The optical fiber condition sensor 31 comprises four fiber sensors 33 arranged one over another in a stand 32 erected on the carriage 19. Each fiber sensor 33 comprises a set of oppositely disposed light-emitting diode and photo transistor. If the optical fiber 1 crosses the beam of light from a light-emitting diode, it is learnt that the optical fiber 1 is at the same level as that diode. The level of the optical fiber 1 shows the slack thereof.

The optical fiber feeder 35 provided downstream of the optical fiber condition sensor 31 comprises a pair of pinch rolls 37 and 38 which are mounted in a stand 36, one placed above the other, to lightly hold the optical fiber 1 therebetween. The upper pinch roll 37 is elevatable. An adjusting screw 40 adjusts the pressure applied on the optical fiber 1. A motor 41 rotates the lower pinch roll 38 through a belt transmission mechanism 42. A cylindrical guide 44 is mounted on the stand 36 on the exit side of the paired pinch rolls 37 and 38.

A control device 47 is provided outside the sealed container 11. The control device 47 receives a signal that indicates the slack of the optical fiber 1 detected by the fiber condition sensor 31. The feed rate of the optical fiber 1 is controlled according to the detected slack thereof. The entering speed of the optical fiber 1 varies with changes in the friction produced between the tube 5 and the optical fiber 1, the pressure of the carrying gas, and so on. If the optical fiber 1 advances at a speed greater than the feed rate thereof, the optical fiber 1 is pulled backward. The backward pulling may either break the optical fiber 1 or prevent the advance thereof. If the advancing speed is slower, on the other hand, the optical fiber 1 slackens and gets entangled in the sealed container, thereby offering an obstacle to the advance thereof. Therefore, the optical fiber 1 fed into the tube must have an appropriate amount of slack. If the slack is too small, the control device 47 accelerates the rotation of the motor 24 that turns the spool 23. If the slack is too large, on the other hand, the rotating speed of the motor 24 is lowered.

A turbulence generator 51 is rotatably attached to the plug 16 through a ball bearing 59. The turbulence generator 51 comprises a cylindrical segment 52 and a funnel-like segment 56 containing the front half of the cylindrical segment 52, as shown in FIGS. 2 to 4. The cylindrical segment 52 has an axial hole 53 through which the optical fiber is admitted. The optical fiber inlet 53 communicates with the funnel-like segment 56 by means of four inlets 54 circularly spaced around the cylindrical segment 52. Vanes 57 are provided between the periphery of the cylindrical segment 52 and the funnel-like segment 56 in such a manner as to separate the adjoining inlets 54. The vanes 57 are twisted with respect to the cylindrical segment 52. Nitrogen gas flows from the sealed container 11 into the tube 5 by way of the funnel-like segment 56 and cylindrical segment 52. The nitrogen gas rapidly flowing from the funnel-like segment 56 into the cylindrical segment 52 through the inlets turns the turbulence generator 51, thereby creating a turbulence in the stream of nitrogen gas. The turbulence thus produced causes the optical fiber 1 to make a surging motion in the cylindrical segment 52.

To the inlet side of the sealed container 11 is connected a nitrogen gas cylinder 61 through a cock 62, a pressure regulating valve 63, a drying filter containing moisture absorbent 64 and a stop valve 65. The nitrogen gas cylinder is filled with nitrogen gas at a pressure of 150 kgf/cm$^2$. The pressure regulating valve 63 lowers the pressure of the nitrogen gas from 150 kgf/cm$^2$ to 40 kgf/cm$^2$.

A heater 71 is provided next to a lead-in pipe 67 of the sealed container 11, and a temperature sensor 72 is installed near the tip of the lead-in pipe 67. When entering the sealed container 11, the temperature of the nitrogen gas from the nitrogen gas cylinder 61 will drop as a result of adiabatic expansion. With this temperature drop, the moisture in the gas held in the container might condense and adhere to the surface of the optical fiber 1 and devices 21, 31, 35 and so on. The heater 71 heats the nitrogen gas to prevent such condensation. A temperature controller 73 controls the heater 71 according to the signals from the temperature sensor 72.

To the sealed container 11 is attached a fiberscope 75 to observe the feed condition of the optical fiber 1 in the sealed container 11. A bypass valve 76, a pressure gauge 77 and an exhaust valve 78 are also attached to the sealed container 11.

A vibrator 81 is provided on the exit side of the sealed container 11. A base frame 82 to support the vibrator 81 is firmly secured on the floor 9 so as not to vibrate. Coil springs 83 to support a vibrating table are mounted at four top corners of the base frame 82.

A flat square vibrating table 84 is mounted on the base frame 82 through the support springs 83, as shown in FIG. 5. A support frame 84 extends downward from the bottom surface of the vibrating table 84.

A turntable 87 is attached to the support frame 86 of the vibrating table 84. A wormgear transmission mechanism 88 rotates the turntable 87. A pair of vibrating motors 91 are mounted on the turntable 87. The motors 91 are symmetrically disposed or turned by 180 degrees, both in place and position, with respect to the center axis C of the vibrating table 84. The vibrating motors 91 are disposed in such a position that the axes of rotation thereof are parallel to a vertical plane containing said center axis C and, at the same time, are oppositely tilted 75 degrees away from the surface of the vibrating table 84. The angle of inclination can be changed as desired by rotating the turntable 87. Unbalanced weights 92 are fastened at both ends of the rotating shaft of each vibrating motor 91. The centrifugal force produced by the rotation of the unbalanced weights 92 imparts a vertical oscillating force to the vibrating table 84. The paired vibrating motors 91 rotate in the same direction, with the same frequency and amplitude. The compounded oscillation produced by the paired vibrating motors 91 causes the vibrating table 84 to vibrate along a helix the center axis of which agrees with the center axis C of the vibrating table 84. Since the vibrating table 84 is mounted on the base frame 82 by way of the support springs 83, the oscillation of the vibrating table 84 is not transmitted to the base frame 82.

A bobbin 94 is fastened on top of the vibrating table 84 by means of bolts and nuts 98 so that the oscillation of the vibrating motor 91 is positively transmitted thereto, with the axis of the bobbin 94 held in substantial agreement with the center axis C of the vibrating table 84. A coil 7 of the tube 5 through which the optical fiber 1 is passed is wound around the bobbin 94. The optical fiber 1 is fed therein from the lower end of the coil 7 of the tube 5. To keep the optical fiber 1 free from excessive bending stress, the diameter of the coil 7 must preferably be not smaller than 150 mm. In this preferred embodiment, a resin-precoated optical fiber and a steel pipe are used as the optical fiber 1 and the tube 5. As shown in FIG. 6, the bobbin 94 has a groove 96 cut by a shaper around the cylindrical barrel thereof so that raised and sunk portions extend along the axis of the bobbin. The wound tube 5 fits closely in the groove 96. The oscillation of the bobbin 94 is precisely transmitted to the tube 5 that is held in the groove on the barrel of the bobbin 94. This assures smooth and efficient insertion of the optical fiber 1 into the tube 5.

A vacuum container 101 is placed alongside the vibrator 81. A fiber-tip sensor 104 is provided to a plug 102 of the vacuum container 101. The fiber-tip sensor 104 comprises a light-emitting diode and an oppositely disposed phototransistor.

A vacuum pump 107 is connected to the vacuum container 101 through piping 108.

A method of inserting the optical fiber 1 into the tube 5 by use of said apparatus will be described in the following.

First, the carriage 19 is pulled out of the sealed container 11. The spool 23 on which the precoated optical fiber 1 is loosely wound is mounted on the bearing stand 22. An appropriate length of the optical fiber 1 released from the spool 23 is passed through the ring 29, fiber feed sensor 31, optical fiber feeder 35 and guide 44. Then, the leading end of the optical fiber 1 somewhat projects beyond the guide 44. The carriage 19 is then pushed into the sealed container 11 and the cover 14 is closed. The leading end of the optical fiber 1 is thus caused to be positioned in the cylindrical segment 52 of the turbulence generator 51.

The coil 7 is formed by winding the tube 5 around the bobbin 94. The bobbin 94 carrying the coil 7 of the tube 5 is then fastened on the vibrating table 84 with the bolts and nuts 98. An appropriate length of the tube 5 is released from the bobbin 94, with a midpoint thereof fastened to the vibrating table 84 by means of metal fasteners 111 and 112. The inlet end of the tube 5 is connected to an outlet tube 113 on the sealed container 11 by means of a ferrule tube coupling 115. A point near the inlet end of the tube 5 is fastened to a fastening table 117 by means of a metal fastener 118. The outlet end of the tube 5 is connected to the plug 102 on the vacuum vessel 101.

To assure the smooth entrance of the optical fiber 1 into the tube 5, there must be a certain amount, preferably 0.1 mm or more, of clearance between the optical fiber 1 and the tube 5. For the same reason, the coil 7 of the tube must have a diameter of not smaller than 150 mm, or preferably not smaller than 300 mm.

Then, the vacuum pump 107 is actuated to evacuate the sealed container 11, tube 5 and vacuum container 101. When the evacuation is substantially complete, the spool motor 24, pinch-roll motor 41 and vibrating motors 91 are actuated while keeping the vacuum pump 107 in operation. Disposed in said place and position, the vibrating motors 91 vibrate the vibrating table 84 helically around the center axis C.

As the cock 62 and stop valve 65 are opened, nitrogen gas rapidly flows into the tube 5 through the sealed container 11 and turbulence generator 51. The high-speed stream of nitrogen gas carries the leading end of the optical fiber 1 into the tube 5. A high-speed turbulence of nitrogen gas produced by the turbulence generator 51 causes the optical fiber 1 to make a surging motion. The loss of nitrogen gas resulting from the inflow into the tube 5 is made up by a fresh supply from the nitrogen gas cylinder 61, whereby the pressure in the sealed container 11 is always maintained at 40 $kgf/cm^2$.

If the travel speed of the optical fiber 1 carried forward through the tube 5 by the stream of nitrogen gas and vibration becomes faster than the feed rate of the pinch rolls 37 and 38 (i.e., the peripheral speed of the pinch rolls), a timer actuates a drive mechanism (both not shown) to release the adjusting screw 40, thereby bringing the bottom pinch-roll motor 41 to a stop. Consequently, the optical fiber 1 passes over the bottom pinch roll 38 and leaves the optical fiber feeder 35. The friction between the optical fiber 1 and the bottom pinch roll 38 is so small that the forward travel of the optical fiber 1 is unaffected.

The optical fiber 1 in the tube 5 is carried forward by the frictional force produced between the rapid stream of nitrogen gas and the surface of the optical fiber 1 and the difference in the static pressure of the nitrogen gas arising between both sides of the surging portion of the optical fiber 1. The oscillation of the tube 5 causes the optical fiber 1 to jump away from the inner surface thereof, thereby preventing the contact therebetween and reducing the frictional force exerted by the inner surface of the tube on the optical fiber 1. This jumping action also exposes the optical fiber 1 to the rapid stream of nitrogen gas flowing in the center of the tube that accelerates the forward travel of the optical fiber 1. The oscillation causes the optical fiber 1 to make a surging motion. The surging portion of the optical fiber 1 prevents the flow of nitrogen gas. Since the flow rate of the nitrogen gas is considerably greater than the advance speed of the optical fiber 1, the stream of nitrogen gas deviates from the surging portion of the tube to create a slip stream. Consequently, the static pressure downstream of the surging portion drops to create a difference in gas pressure between the upstream and downstream sides thereof. The force to carry forward the optical fiber 1 is equal to said difference in pressure multiplied by the projected area of the surging portion on a plane perpendicular to the direction of the flow of nitrogen gas (or the axis of the tube). This additional force accelerates the advance of the optical fiber 1 that is carried forward by the frictional force the nitrogen gas exerts on the peripheral surface of the optical fiber 1 and the static pressure working on an area corresponding to the cross-sectional area thereof.

The vibrating table 84 vibrates helically around the center axis C. Accordingly, the coil of the tube 5 vibrates in such a manner as to reciprocate along a helical path starting at any given point on the tube 5. This vibration also sends the optical fiber 1 forward on the same principle as that of the vibrating conveyor.

As mentioned before, the surge of the optical fiber 1 prevents the flow of nitrogen gas. With tubes of smaller diameters and greater lengths, therefore, the pressure of nitrogen gas in the sealed container 11 must be kept considerably high as in the preferred embodiment being described.

When the sealed container 11 has a large capacity or when the pressurized gas is gradually supplied into the sealed container 11, the initial carrying force of the gas stream may not be great enough to assure smooth insertion of the optical fiber 1. When the stop valve 65 is opened to introduce nitrogen gas from the cylinder 61 into the sealed container 11, to be more specific, the gas flow rate at the inlet of the tube may not be great enough to create the force needed to send in the optical fiber 1. On such occasion, the optical fiber 1 must be preliminarily inserted in the tube either by hand or such mechanical means as the pinch rolls used in the embodiment being described. The gas stream in the tube will exerts an adequate carrying force on the optical fiber 1 thus inserted beforehand. The length of initial insertion ranges from several meters to ten-plus meters, depending on the size and surface condition of the tube and the optical fiber, the pressure and kind of the pressurized gas, and so on.

The optical fiber 1 may be supplied from above the coil of the tube 5. The coil of the tube may be placed with the axis thereof horizontal. The coil of the tube 5 may be oscillated by an electromagnetic vibrator. To facilitate the insertion of the optical fiber 1 into the tube, the coil must be vibrated with a frequency of not less than 1 Hz, preferably not less than 10 Hz, and a total amplitude of not smaller than 1 $\mu$m, preferably not smaller than 0.1 mm. Preferably, the upper limit of the frequency and amplitude must be as high as possible so long as as the optical fiber 1 remains undamaged by vibrations. Ultrasonic vibrations may be used, too. But vibrations of whatever kind should preferably have at least a component that is perpendicular to the optical fiber 1 advancing through the tube 5. Also, the maximum vertical acceleration of vibration should preferably be not smaller than the acceleration of gravity. When the pressurized gas exerts a great carrying force, the vibration of the coil of the tube 5 may be limited to the direction that is perpendicular to the direction of travel of the optical fiber 1. Then, the optical fiber 1 is carried forward by the stream of nitogen gas alone, without being assisted by vibrations.

When the fiber-tip sensor 104 provided in the plug 102 of the vacuum container 101 detects the leading end of the optical fiber 1 thus carried forward, the stop valve 65 is closed to discontinue the supply of nitrogen gas. At the same time, the spool 23, vibrator 81 and vacuum pump 107 are also stopped. When the optical fiber 1 in the tube needs additional length, the supply of nitrogen gas is stopped and the outlet end of the tube 5 is closed. Then, the spool 23 and vibrator 81 are actuated again until the desired surplus length is obtained.

Preferred Embodiment II

Figure 7:
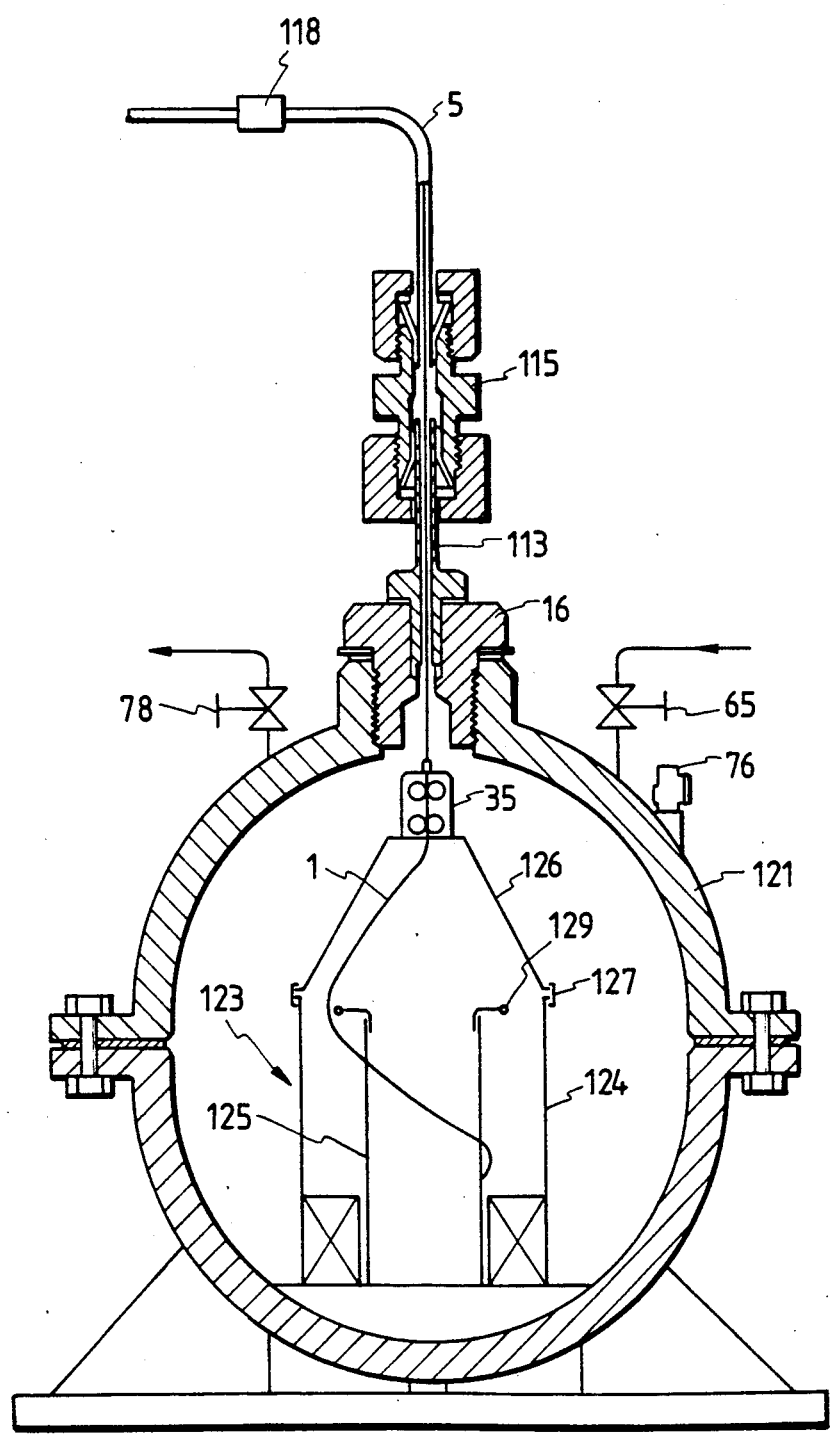
FIG. 7 is a vertical cross-sectional view showing another preferred embodiment of the device that inserts the optical fiber into the tube while giving a surging motion thereto.
Figure 8:
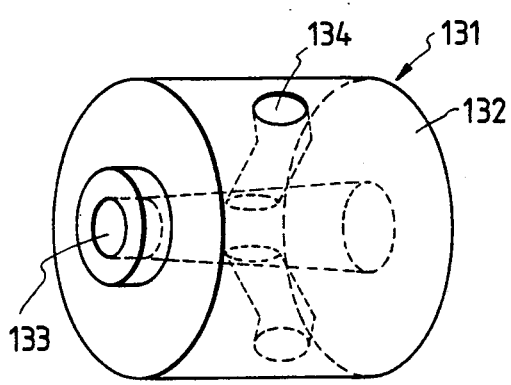
FIG. 8 is a perspective view showing another preferred embodiment of the turbulence generating device.

FIG. 7 shows a second preferred embodiment of this invention. In FIG. 7, parts similar to those shown in FIGS. 1a and 1b are designated by the same reference characters, with the description thereof omitted.

In this preferred embodiment, the means to supply the optical fiber 1 from the sealed container 11 to the tube 5 is different from that used in the first preferred embodiment described before. An open-topped container 123 to hold the optical fiber 1 is installed in a spherical sealed container 121. The open-topped container 123 comprises an outer cylinder 124, an inner cylinder 125 and a cover 126 that is shaped like a truncated cone. The cover 126 is detachably mounted on top of the outer cylinder 124 by means of a fastening band 127. A guide ring 129 is attached to the upper end of the inner cylinder 125. An optical fiber feeder 35 analogous to the one in said first embodiment is provided on top of the cover 126.

A method of inserting the optical fiber 1 into the tube 5 by use of this second preferred embodiment is described in the following.

The optical fiber 1 is pre-loaded in the open-topped container 123. The optical fiber 1 held in the top-opened container 123 is in layered loops. Therefore, the optical fiber 1 pulled up to outside the top-opened container 123 is taken from the uppermost loop, gradually descending as the operation proceeds. On this occasion, the optical fiber 1 gets twisted 360 degrees maximum per loop. In the course of the forward travel, the twisted optical fiber 1 warps to regain the original form, thereby offering a resistance to the travel and thus hampering the inserting operation. Preferably, therefore, the optical fiber 1 should be twisted in the opposite direction when preloaded in the top-opened container 123 so that the twist later given to the outgoing optical fiber 1 is offset. Unlike the optical fiber 1 would around a spool, the optical fiber 1 held in the top-opened container has no set curl. The outgoing optical fiber 1 is free from the inertial resistance built up by the subsequent optical fiber 1. This eliminates the need to provide an optical fiber condition sensor 31 of the type as shown in FIG. 1.

As in the first preferred embodiment, a coil of the tube 5 is formed around a bobbin 94 which is fastened on a vibrating table 84. Then, the inlet end of the tube 5 is connected to an outlet tube 113 on a sealed container 11 by means of a ferrule coupling 115. To ensure that adequate carrying force works on the optical fiber 1 in the initial stage of the inserting operation, the leading end of the optical fiber 1 is pulled out, in a length of a few meters, of the sealed container 121 by means of the optical fiber feeder 35. The leading end thus taken out is pushed into the tube 5. The subsequent operations, such as the actuation of a vibrating motor 91 and the supply of nitrogen gas to the sealed container 121, are similar to those of the first preferred embodiment. If the speed of the optical fiber 1 carried forward through the tube by the stream of nitogen gas and vibrations becomes greater than the feed rate of the optical fiber feeder 35 (i.e., the peripheral speed of the pinch rolls), the optical fiber feeder 35 discontinues the feed of the optical fiber 1 as in the first preferred embodiment.

In the second preferred embodiment, the optical fiber 1 is vertically pulled up from the top-opened container 123 by the length that is to be inserted into the tube 5. Therefore, the optical fiber 1 does not slacken as in a first preferred embodiment. The resulting elimination of the optical fiber feed spool 23 and fiber condition sensor 31 permits simplifying the structure of the whole apparatus.

EXAMPLE

Using the apparatus shown in FIGS. 1a and 1b, an optical fiber was inserted into a steel pipe under the following conditions:

(1) Specimens

Coil of steel pipe: a coil of steel pipe, 1000 m in length and 1.0 mm and 0.8 mm in outside and inside diameter, wound around a steel bobbin having a barrel diameter of 1200 mm Optical fiber: a 0.4 mm diameter optical fiber comprising 125 μm diameter threads of quartz glass coated with silicone resin (2) Pressurized gas Nitrogen gas under a pressure of 40 kgf/cm$^2$ (3) Vibrating conditions Frequency: 20 Hz Angle of vibration: 15 degrees Total amplitude: 1.25 mm Maximum vertical acceleration: 1.5 g (4) Surge Pinch: about 100 mm Total amplitude: about 0.3 mm (5) Insertion data Travel speed of fiber: 125 m/min.

Insertion time: 8 min.

This invention should not be limited to the particulr preferred embodiments described.

When the turbulence generator was not used and the tube was not vibrated in the example just described, it was impossible to insert the optical fiber into the tube beyond a length of 350 m. The travel speed of the fiber then was 20 m/min.

Not only a single optical fiber but also a plurality of optical fibers can be inserted into the tube if the relationship between the inside diameter of the tube and the diameter of the optical fiber allows. The preferred embodiments described above used the optical fiber made up of precoated threads and a steel tube. Of course this invention is not limited to the above combination. Various variations are possible. For example, optical fibers or cables thereof may be inserted into tubes of aluminum or synthetic resin. Any other types of thread than the optical fiber that can be carried forward by the stream of gases can be inserted into tubes. The pressurized gas is not limited to nitrogen gas. Air, argon or other appropriate gas can be used. The outlet end of the tube 5 may be opened into the atmosphere, instead of being connected to the vacuum container 101.

A greater surging motion can be imparted to the thread if the tube 5 is vibrated with an amplitude which has both forward and backward components. Intermittent vibration of the tube is conducive to reducing the risk of damaging the inserted thread. If the length is as short as several tens of meters, the tube may be vibrated in a straight condition. With longer tubes, coiling or looping facilitates the handling of the tube and assures effective vibration throughout the entire length.

Figure 9:
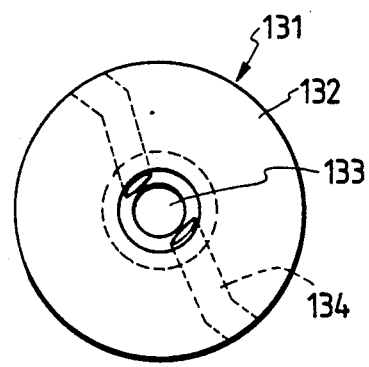
FIG. 9 is a front view of the turbulence generating device of FIG. 8.

For producing surging turbulence, not only the device shown in FIGS. 2 to 4 but also a turbulence generator 131 shown in FIG. 9 may be used. The turbulence generator 131 comprises a cylindrical body 132 and an optical fiber inlet 133 that are disposed coaxially. Two gas inlets 134 lead from the peripheral surface of the cylindrical body 132 into the fiber inlet 133. The gas inlets 134 are aslant with respect to the fiber inlet 133. The turbulence generator 131 is attached to the plug 16 on the sealed container 11 through a ball bearing 59, as in a first preferred embodiment. A stream of pressurized gas whirls from the gas inlets 134 to the fiber inlet 133. As the cylindrical body 132 rotates, therefore, a turbulence occurs in the stream of gas, thereby imparting a surging motion to the optical fiber 1 in the fiber inlet 133.

Also, a pulsated or intermittent flow of gas can cause the optical fiber to surge. Surge generators shown in FIGS. 10 and 11 produce a pulsated or intermittent stream of gas. A surge generator shown in FIG. 10 comprises a cylindrical body 141 and a fiber passage 143 that are disposed coaxially. A high-pressure gas inlet 144 leads from the peripheral surface of the cylindrical body to the fiber passage 143. The surge generator 141 is attached to the outlet tube 113 on the sealed container 11 shown in FIG. 1a. The high-pressure gas inlet 144 communicates with the sealed container 11 through piping 147 in which a solenoid stop valve 146 is provided. By opening and closing the solenoid stop valve 146 with a frequency of not less than 1 Hz, the high-pressure gas is intermittently led into the fiber passage 143. A pulsated or intermittent stream of high-pressure gas thus produced gives a surging motion to the optical fiber 1. A surge generator 151 shown in FIG. 11 comprises a cylindrical body 152 and a fiber passage 153 that are disposed coaxially. An exhaust port 154 leads from the peripheral surface of the cylindrical body to the fiber passage 153. The surge generator 151 is attached to the outlet tube 113 on the sealed container 11 shown in FIG. 1a. The exhaust port 154 opens into the atmosphere through piping 157 in which a solenoid stop valve 156 is provided. By opening and closing the solenoid stop valve 156 with a frequency of not less than 1 Hz, the high-pressure gas in the fiber passage 153 is intermittently released into the atmoshpere through the piping 157. The pulsated or intermittent stream of high-pressure gas thus produced imparts a surging motion to the optical fiber 1.

Figure 10:
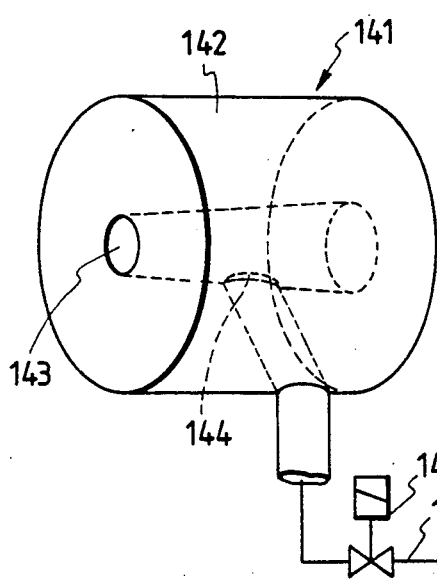
FIG. 10 is a perspective view showing another preferred embodiment of the device to give a surging motion to the optical fiber.
Figure 11:
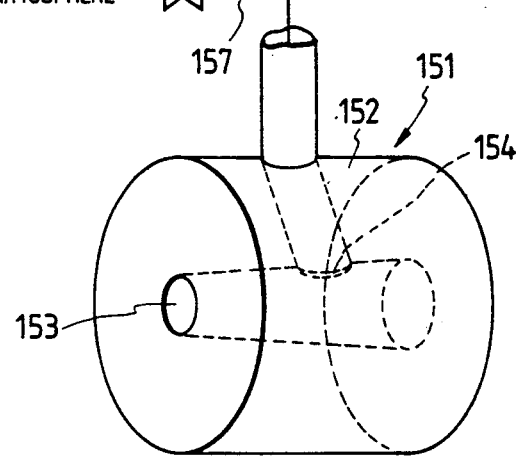
FIG. 11 is a perspective view showing still another preferred embodiment of the device to give a surging motion to the optical fiber.

The surge generators 141 and 151 shown in FIGS. 10 and 11 and may be used in combination.

Figure 12:
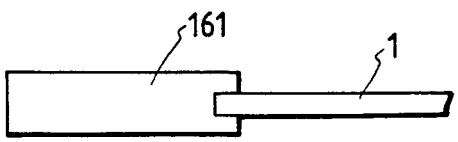
FIG. 12 is a side elevation of yet another preferred embodiment of the device to give a surging motion to the optical fiber.

Also, a fin 161 shown in FIG. 12 may be provided on the leading end of the optical fiber to produce a surging motion. The fin 161 is made of a thin piece of plastic or metal. The fin 161 fluttered by a stream of pressurized gas causes the optical fiber 1 to surge.

Depending on the size of the optical fiber 1 and the tube 5, the turbulence generator 51 of the first embodiment may be eliminated. Or, conversely, a turbulence generator may be used in the second embodiment.

In the preferred embodiments I and II just described, the optical fiber 1 to be fed into a tube is held in the sealed container 11 or 121. In a preferred embodiment shown in FIG. 13, the optical fiber 1 to be fed into a tube is placed outside the sealed container 11. FIG. 13 is similar to FIG. 1a. The downstream end (at the left of the drawing) the device in FIG. 13 is connected to the device shown in FIG. 1b. Similar parts in FIG. 13 are designated by similar reference characters used in FIG. 1a, with no description given thereabout.

A plug 167 is screwed into the rear end of the hermetically sealed container 11. A guide tube 170 bent downward is attached to the rear end of the plug 167. A labyrinth packing 171 is fitted in the plug 167.

A carriage 19 in the sealed container 11 carries an optical fiber forwarder 173, an optical fiber condition sensor 31 and an optical fiber feeder 35.

The optical fiber forwarder 173 comprises a pair of pinch rolls 175 and 176 which are mounted on a stand 174, one placed above the other, to lightly hold the optical fiber therebetween. The upper pinch roll 175 is elevatable. An adjusting screw 177 adjusts the pressure applied on the optical fiber 1. A motor 178 rotates the lower pinch roll 176 through a belt transmission mechanism 179. As in the embodiment described previously, a control device 47 provided outside the sealed container controls the speed of the motor 178.

Next, a method of inserting an optical fiber 1 into a tube 5 with the device just explained will be described.

An optical fiber 1, in a looped, coiled or other readily loosenable form, is pre-loaded in the top-opened container 123. Then, the carriage 19 is pulled out of the sealed container 11. A suitable length of the optical fiber 1 unwound from the top-opened container 123 is passed through a guide tube 170 and the labyrinth packing 171. The loosened optical fiber 1 travels forward through the optical fiber forwarder 173, fiber condition sensor 31, the optical fiber feeder 35 and guide 44 in that order, with the tip of the optical fiber 1 projecting beyond the guide 44. With the optical fiber 1 kept in this state, the carriage 19 is pushed into the sealed container 11, and the cover 14 is closed. The tip of the optical fiber 1 is inside the cylindrical segment 52 of the turbulence generator 51. The bobbin 94 takes up the tube 5 to form a coil 7. The steps following this are the same as in the operation of the preferred examples I and II.

Other less frictional packing than the labyrinth packing 171, such as a lip packing, may be used in the hermetically sealed segment through which the optical fiber 1 is passed. When a lip or other similar packing is used, it is preferable to apply a lubricant on the optical fiber 1 on the entry side of the packing in order to reduce the creation of friction between the optical fiber and packing. The optical fiber forwarder 173 may be placed outside the sealed container 11. Also, the optical fiber forwarder 173 may be made up of a pair of belts, instead of the paired pinch rolls 175 and 176, to hold the optical fiber 1 therebetween.

A spool may be used in place of the top-opened container 123 to hold the optical fiber. The spool need not necessarily be driven except when the spool on which the optical fiber has been wound has a large moment of inertia.

As mentioned before, it is preferable to reversely pre-twist an optical fiber 1 that is to be held in the top-opened container 123 to avoid a kink that might develop when the optical fiber 1 is later taken out of the sealed container 123. FIG. 14 shows an example of a means of giving a reverse twist to the optical fiber 1. The optical fiber 1 is supplied to the cylindrical body 124 of the top-opened container 123 through a guide tube 181, a caterpillar feeder 182 and a rotating guide tube 183. The rotating guide tube 183 is eccentric to an outer cylinder 124 by $\delta$. A motor (not shown) rotates the outer cylinder 124 about a center axis X, while a motor (not shown) rotates the rotating guide tube 183 through a gear transmission 184 about an axis Y, both in the same direction. The optical fiber 1 fed from the rotating guide tube 183 into the outer cylinder 124 gradually piles up circumferentially from the bottom, in loops eccentric to each other by a width of $2\delta$, to form a coil. If the rotating speed of the outer cylinder 124 is $V_P$ and that of the rotating guide tube 183 is $V_G$, the angle of reverse twist $\theta = 360° (1 - V_P/V_G)$. If the rotating speed $V_P$ of the outer cylinder 124 is sufficiently smaller than the rotating speed $V_G$ of the rotating guide tube 183, the angle of reverse twist $\theta$ becomes substantially equal to 360 degrees. As a consequence, the optical fiber 1 does not form a kink when unwound from the coil 2, and does not become entangled or twisted. Making no revolution, the optical fiber 1 without a kink is readily passed into the tube 5.

What is claimed is:

1. An apparatus for inserting a thread into a tube by utilizing a stream of gas which comprises:
    a sealed container;
    means for supplying the thread provided in the sealed container;
    a pressurized gas supply source connected to the sealed container;
    a coupling on said container for connecting one end of the tube into which the thread is inserted to the sealed container; and
    means for vibrating the tube for giving a positive surging motion to the thread.

2. An apparatus for inserting a thread into a tube, which comprises:
    a sealed container having an entry end and an exit end and having an apertured plug at the entry end hermetically sealed to the remainder of said container through which thread is supplied to the entry end, and a coupling connected to the exit end thereof for connecting the tube to said container;
    means for supplying the thread provided outside the sealed container;
    an auxiliary means for supplying the thread to move the thread from the means for supplying the thread into the sealed container through said plug;
    a pressurized source of gas connected to said sealed container; and
    means for vibrating the tube for giving a positive surging motion to the thread.

3. An apparatus for inserting a thread into a tube according to claim 2, in which the means for supplying the thread comprises a spool.

4. An apparatus for inserting a thread into a tube according to claim 1 or 2, in which the means for supplying the thread comprises a spool and means for driving the spool.

5. An apparatus for inserting a thread into a tube according to claim 1 or 2, in which the means for supplying the thread comprises a top-opened container that contains the coiled thread, the thread being pulled upward out of the top-opened container.

6. An apparatus for inserting a thread into a tube according to claim 2, in which the auxiliary means for supplying the thread comprises a pair of pinch rolls to lightly hold the thread therebetween and means to rotate one of the paired pinch rolls.

7. An apparatus for inserting a thread into a tube according to claim 1 or 2, in which a thread feeder is provided in the sealed container.

8. An apparatus for inserting a thread into a tube according to claim 7, in which the thread feeder comprises a pair of pinch rolls that lightly hold the thread therebetween and means for driving the paired pinch rolls.

9. An apparatus for inserting a thread into a tube according to claim 1 or 2, in which said means for vibrating the tube comprises a vibrator that vibrates the tube with a component perpendicular to the center axis of the tube.

10. An apparatus for inserting a thread into a tube according to claim 1 or 2, further comprising a further means for giving a positive surging motion to the thread, which further means comprises a turbulence generator comprising a hollow cylindrical segment and a funnel-like segment having the smaller diameter end on said cylindrical segment and from which the downstream half of the cylindrical segment projects, gas inlets in said cylindrical segment between the interior of said cylindrical segment and the funnel-like segment, and vanes in said funnel-like segment twisted with respect to the cylindrical segment and positioned between the peripheral surface of the cylindrical segment and the funnel-like segment, the downstream end of the cylindrical segment being rotatably attached to the outlet of said sealed container.

11. An apparatus for inserting a thread into a tube according to claim 1 or 2, further comprising further means for giving a positive surging motion to the thread, which further means comprises a turbulance generator having a cylindrical segment with a coaxial thread inlet and gas inlets leading from the peripheral surface of the cylindrical segment to the thread inlet and angled toward the downstream end of the thread inlet, the downstream end of the cylindrical segment being rotatably attached to the outlet of the sealed container.

12. An apparatus for inserting a thread into a tube according to claim 1 or 2, further comprising means for giving a positive surging motion to the thread, which further means comprises a surge generator having a cylindrical segment with a coaxial thread passage and a pressurized gas inlet leading from the peripheral surface of the cylindrical segment to the thread passage and angled toward the downstream end thereof, piping having one end connected to said pressurized gas inlet and having a solenoid stop valve therein and having the other end open to the interior of said sealed container, said sealed container having an outlet tube thereon to which said surge generator is attached, and means for intermittently opening and closing the solenoid stop valve for intermittently supplying gas to the thread passage.

13. An apparatus for inserting a thread into a tube according to claim 1 or 2, further comprising means for giving a positive surging motion to the thread, which further means comprises a surge generator having a cylindrical segment with a coaxial thread passage and an exhaust port leading from the peripheral surface of the cylindrical segment to the thread passage and angled toward the upstream end thereof, piping having one end connected to said pressurized gas inlet and having a solenoid stop valve therein and having the other end open to the atmosphere, said sealed container having an outlet tube thereon to which said surge generator is attached, and means for intermittently opening and closing the solenoid stop valve for intermittently releasing gas to the atmosphere.

14. An apparatus for inserting a thread into a tube according to claim 1 or 2, further comprising further means for giving a positive surging motion to the thread, comprising a fin adapted to be attached to the leading end of the thread.

15. An apparatus for inserting a thread into a tube according to claim 1 or 2, which further comprises means for detecting a slack of the thread ahead of the inlet end of the tube and means responsive to said detecting means and connected to the means for supplying the thread for controlling the feed rate of the thread according to the amount of the detected slack.

16. An apparatus for inserting a thread into a tube by utilizing a stream of gas, which comprises:
a sealed container;
means for supplying the thread and provided in said sealed container;
a pressurized gas supply source connected to said sealed container;
a coupling on said container for connecting one end of the tube into which the thread is to be inserted to the sealed container; and
means for moving the thread within the tube so that a portion of the thread is aslant to the center axis of the tube for building up a difference in the static pressure of the gas ahead of and behind the aslant portion for giving a positive longitudinal surging motion to the thread advancing through the tube.

17. An apparatus for inserting a thread into a tube, which comprises:
a sealed container having an entry end and an exit end and having an apertured plug at the entry end hermetically sealed to the remainder of said container through which thread is supplied to the entry end, and a coupling connected to the exit end thereof for connecting the tube to said container;
means for supplying the thread provided outside the sealed container;
an auxiliary means for supplying the thread to move the thread from the means for supplying the thread into the sealed container through said plug;
a pressurized source of gas connected to said sealed container; and
means for moving the thread within the tube so that a portion of the thread is aslant to the center axis of the tube for building up a difference in the static pressure of the gas ahead of and behind the aslant portion for giving a positive longitudinal surging motion to the thread advancing through the tube.

18. An apparatus for inserting a thread into a tube according to claim 17 in which the means for supplying the thread comprises a spool.

19. An apparatus for inserting a thread into a tube according to claim 16 or 17 in which the means for supplying the thread comprises a spool and means for driving the spool.

20. An apparatus for inserting a thread into a tube according to claim 16 or 17, in which the means for supplying the thread comprises an open-topped container that contains the thread in a coil, the thread being pulled upwardly out of the container.

21. An apparatus for inserting a thread into a tube according to claim 17, in which the auxiliary means for supplying the thread comprises a pair of pinch rolls to lightly hold the thread therebetween and means to rotate one of the paired pinch rolls.

22. An apparatus for inserting a thread into a tube according to claim 16 or 17, in which a thread feeder is provided in said sealed container.

23. An apparatus for inserting a thread into a tube as claimed in claim 22 in which said thread feeder comprises a pair of pinch rolls that lightly hold the thread therebetween and means for driving the paired pinch rolls.

24. An apparatus for inserting a thread into a tube as claimed in claim 16 or 17 in which the means for moving the thread comprises a vibrator that vibrates the tube.

25. An apparatus for inserting a thread into a tube as claimed in claim 24, in which said vibrator is a vibrator that vibrates the tube with a component perpendicular to the center axis of the tube.

26. An apparatus for inserting a thread into a tube according to claim 16 or 17, in which said means for moving the thread comprises a turbulance generator comprising a hollow cylindrical segment and a funnel-like segment having the smaller diameter end on said cylindrical segment and from which the downstream half of the cylindrical segment projects, gas inlets in said cylindrical segment between the interior of said cylindrical segment and the funnel-like segment, and vanes in said funnel-like segment twisted with respect to the cylindrical segment and positioned between the peripheral surface of the cylindrical segment and the funnel-like segment, the downstream end of the cylindrical segment being rotatably attached to the outlet of said sealed container.

27. An apparatus for inserting a thread into a tube according to claim 26 in which said means for moving the thread further comprises a vibrator to oscillate the tube.

28. An apparatus for inserting a thread into a tube according to claim 16 or 17, in which said means for moving the thread comprises a turbulance generator having a cylindrical segment with a coaxial thread inlet and gas inlets leading from the peripheral surface of the cylindrical segment to the thread inlet and angled toward the downstream end of the thread inlet, the downstream end of the cylindrical segment being rotatably attached to the outlet of the sealed container.

29. An apparatus for inserting a thread into a tube according to claim 28 in which said means for moving the thread further comprises a vibrator to oscillate the tube.

30. An apparatus for inserting a thread into a tube according to claim 16 or 17, in which said means for moving the thread comprises a surge generator having a cylindrical segment with a coaxial thread passage and a pressurized gas inlet leading from the peripheral surface of the cylindrical segment to the thread passage and angled toward the downstream end thereof, piping having one end connected to said pressurized gas inlet and having a solenoid stop valve therein and having the other end open to the interior of said sealed container, said sealed container having an outlet tube thereon to which said surge generator is attached, and means for intermittently opening and closing the solenoid stop valve for intermittently supplying gas to the thread passage.

31. An apparatus for inserting a thread into a tube according to claim 30 in which said means for moving the thread further comprises a vibrator to oscillate the tube.

32. An apparatus for inserting a thread into a tube according to claim 16 or 17, in which said means for giving moving the thread comprises a surge generator having a cylindrical segment with a coaxial thread passage and an exhaust port leading from the peripheral surface of the cylindrical segment to the thread passage and angled toward the upstream end thereof, piping having one end connected to said pressurized gas inlet and having a solenoid stop valve therein and having the other end open to the atmosphere, said sealed container having an outlet tube thereon to which said surge generator is attached, and means for intermittently opening and closing the solenoid stop valve for intermittently releasing gas to the atmosphere.

33. An apparatus for inserting a thread into a tube according to claim 32 in which said means for moving the thread further comprises a vibrator to oscillate the tube.

34. An apparatus for inserting a thread into a tube according to claim 16 or 17 in which the means for moving the thread comprises a fin adapted to be attached to the leading end of the thread.

35. An apparatus for inserting a thread into a tube according to claim 34 in which said means for moving the thread further comprises a vibrator to oscillate the tube.

36. An apparatus for inserting a thread into a tube according to claim 16 or 17 which further comprises means for detecting a slack of the thread ahead of the inlet end of the tube and means responsive to said detecting means and connected to the means for supplying the thread for controlling the feed rate of the thread according to the amount of the detected slack.

* * * * *